United States Patent Office 2,738,266
Patented Mar. 13, 1956

2,738,266
PROCESS OF SEPARATING NICKEL AND COBALT

Martinus H. Caron, Rijswijk, Netherlands

No Drawing. Application September 28, 1951,
Serial No. 248,887

2 Claims. (Cl. 75—119)

The separation of nickel and cobalt, when present in ammonia-ammonium carbonate liquors, can be accomplished, inter alia, in accordance with my U. S. specification No. 2,290,313. This discloses the results of a stepwise distillation of such liquors containing a relatively small amount of Co. Obviously, increase of the Co content of the liquor will have the effect that more Co will be retained by the basic Ni-carbonate precipitated during distillation. Hereinafter this stepwise separation of the Ni-precipitate will be referred to as "the distillation process."

The said separation can also be effected in accordance with my French patent specification No. 931,765, which discloses a process by which the Ni is precipitated from a saturated Ni-solution by saturating the same with $CO_2$ at room temperature. This process will hereinafter be referred to as the "$CO_2$-saturation process."

More information about these processes has been published in "The Journal of Metals," Transactions A. I. M. E., vol. 188, January 1950, pages 91–103.

It has now been found that the pregnant liquors to be treated are often of such a nature that, although the red colour thereof would indicate the presence of cobalt as trivalent cobalt, evidence has been obtained that some colbalt is also present in another valency, and that this condition unfavorably affects the outcome of the separation. Pregnant liquors obtained, for instance, from cobalt earth or laterite ore, although containing the major part of the Co in the trivalent state, almost invariably contain some Co in another form.

The factors that prevent complete conversion of Co to the trivalent state are not exactly known, but evidently this is due to the specific character of the reduced ore itself and its influence during the dissolution of the values. Prolonged agitation of the ore pulp in contact with pure oxygen does not improve the result, whereas complete oxydation of the Co compounds to the red trivalent state does take place if sponge nickel and sponge cobalt are dissolved under due aeration.

Amongst the impurities of the reduced ore that will go into solution, sulfur and its compounds are often regarded as the main cause of the difference in behavior observed, but this view is not in agreement with observed facts, since under certain conditions the sulfur compounds in the liquor do not interfere with the complete oxydation of the Co to the trivalent state.

The Fe-Ni-Co solid solutions resulting from the selective reduction of the ore have a strong tendency to take up sulfur from any sulfur compound present and will do so in the course of reduction. Consequently, this element will be dissolved simultaneously with the values in the leach liquor, and, under the prevailing conditions of the liquor, the sulfur is oxidized to sulfate to a considerable extent. It may be expected, therefore, that trivalent Co present in the liquor will combine not only with $CO_3$ to $Co(NH_3)_6CO_3$, but also with $SO_4$ to $Co(NH_3)_6SO_4$.

The said first complex compound imparts the liquor a pronounced red colour, which strongly predominates the less marked organe tint of the sulfate compound.

The said second compound cannot be decomposed by straight distillation under atmospheric pressure, contrary to the red trivalent compound. Due thereto, the orange sulfate compound can be isolated by distillation from the red trivalent Co-compound, which will be precipitated as $Co(OH)_3$. If the resulting clear filtrate is allowed to stand and cool, crystals of well defined orange coloured sulfate ammonia compounds will be gradually formed.

Normally, pregnant liquors obtained from the class of ores mentioned will have a violent to red colour, depending upon the Co-to-Ni ratio in the liquor, in which Co is no doubt also to a certain extent present in other forms besides those stated above. This may be proved, for instance, by subjecting the liquor to the $CO_2$-saturation process twice in succession. The first filtrate, after precipitation of 85% of the Ni, is usually red coloured. By redissolving this Ni-precipitate and repeating the treatment, a second filtrate will be obtained, which usually has a green or yellowish green shade.

If, on the other hand, a synthetic liquor is properly prepared, for instance by dissolving pure $CoCO_3$ and pure basic nickel carbonate in ammonia-ammonium carbonate free from sulfate and by agitation and due aeration, a liquor will result from which the first filtrate will be red coloured and the second pink, violet or rosa. This last shade is also indicative for trivalent cobalt $Co(NH_3)_6CO_3$, but the fact that the much weaker coloured blue nickel ion shades the red cobalt ion visible in the liquor, makes it evident that the amount of cobalt retained in the second filtrate is relatively small as a result of the efficient first selective separation.

If both liquors had the same Co-to-Ni ratio and the same combined Ni-Co values, it would have been found that the second precipitate of basic nickel carbonate from the synthetic liquor had a much lower Co-content than the corresponding precipitate from the pregnant liquor resulting from ore leaching. It would also have been found that the green coloured second filtrate from the pregnant liquor still contained a non-negligible amount of Co, although not perceptible by the normal indication caused by the red trivalent cobalt, and analysis of the Ni-products would have revealed the fact that the separation of Ni and Co from the synthetic liquor effected by the said treatment was much more advanced than that from the pregnant ore liquor.

The following figures may be given to illustrate the effect of the separation in the two cases contemplated.

Assuming that the synthetic liquor had a Co-content of 6% (Ni+Co) and a combined metal value content of 1.3%, the $CO_2$-saturation of the liquor would have resulted in the precipitation of about 85% of the Ni at room temperature. Simultaneously, about 15% of the Co would have been co-precipitated and the final outcome of a double treatment would have been that Co in an amount of about 0.2% of (Ni+Co) would have been found in the highly refined second Ni-precipitate.

If the pregnant ore liquor, containing the same values, had been treated in the same manner, the first precipitate would have retained some 25% of the Co-content of the liquor, and the second precipitate 40–50% of the amount present in the liquor from the redissolved first Ni-precipitate. Thus, the final Ni-product would have contained approximately 1% Co of (Ni+Co).

The above figures give a clear picture of the difference between the results obtained by treating, under corresponding conditions, the one and the other of the two liquors under consideration, and it is therefore evident that an efficient separation can only be realized if the Co present in the liquor is entirely in the trivalent state. This is necessary not only to obtain a better Ni-product, but also to ensure a higher recovery of the valuable Co.

The results of the treatment of the pregnant ore liquor also indicate that the first Ni-product retained more Co than the Ni-product from the synthetic liquor. No doubt this was due to the presence of Co in the non-trivalent state. Since this first Ni-precipitate was redissolved for the second treatment, the undesired Co-compound or compounds that caused the increased co-precipitation of Co must have accumulated proportionally in the second liquor. This explains the observed fact, that 40–50% of the Co was retained or co-precipitated in 85% Ni precipitated from the second liquor. If the Co would have been present in the trivalent state throughout, as was the case in the synthetic liquor, the difference, as far as selectivity is concerned, between two successive treatments by the $CO_2$-saturation process would not have been appreciable. Experimentally it has been proved that Co, if present in the liquor in the bivalent state, will readily co-precipitate with the Ni, so that under these conditions separation of Co and Ni will be impossible when the liquor is treated as stated hereinbefore.

From the facts stated it may be concluded that the trivalent state of the Co-compounds present in the liquor is essential for an efficient separation of Ni and Co.

If the presence of bivalent cobalt in the liquor would have caused decreased selectivity or unsatisfactory separation of Ni and Co when using the processes referred to, oxydation of the bivalent to trivalent Co would have been the remedy. Unfortunately, it has been proved by experiment that aeration or agitation of the pregnant liquor, even hot, with pure oxygen does not produce the desired effect. Consequently, the form of the Co that causes decreased selectivity must be regarded as refractory under the conditions stated.

The use of chemical oxydizing agents has the drawback of contaminating the pure liquors and may also be the cause of corrosion of the apparatus. These undesired effects can be avoided and an effective separation ensured by the use of my present invention.

I have discovered that by the following combination of treatments, complete conversion of all cobalt compounds to the trivalent state can be readily effected without the use of chemical oxidizing agents other than elemental oxygen. The first or preliminary treatment consists of a complete reduction of all cobalt compounds present in the liquor to the bivalent state by means of sponge nickel or finely divided nickel. The sponge nickel can be obtained, for instance, by reducing basic nickel carbonate at about 600° C. This product is very reactive. The reduction of the liquor with sponge nickel should be effected in hot or boiling state in order to facilitate rapid reduction of the higher valencies of the cobalt compounds to the bivalent state. In addition, it is preferred first to boil out any dissolved oxygen prior to the reduction, and the liquor should contain a sufficient amount of free ammonia in order that the reactions may proceed satisfactorily. This reduction proceeds according the following equation:

$$2Co''' + Ni = 2Co'' + Ni''$$

One part of nickel, therefore, will reduce two parts of trivalent cobalt to the bivalent state. Obviously, the sponge nickel will not contaminate the liquor, since said metal is a constituent of the original liquor.

After this treatment, the impurities initially present in the pregnant liquor, for instance sulfur compounds, have not disappeared. Nevertheless, if the cooled liquor would thereafter be subjected to due aeration or agitation with oxygen, the result would be a material improvement in the outcome of the separation as effected by the processes referred to. Consequently, it is evident that a high degree of oxidation of cobalt to the trivalent state was the result of the reduction-reoxydation treatment. This remarkable result is obtained without contamination of the liquor with chemicals and consequently the Ni-product obtained from such liquors will have the same high degree of purity, additional advantages being a materially decreased final Co-content and avoidance of corrosion.

This beneficial result can also be obtained as follows: The distillation of the pregnant liquor, with complete precipitation of all the values, is effected in the presence of sponge nickel. The precipitate of such treatment will have an olive green colour. It is very fast filtering and Co is present therein as cobaltous hydroxide or cobaltous basic carbonate. If this precipitate is redissolved in ammonia liquor and isolated from the excess of sponge nickel, a liquor will result in which the bivalent Co can be readily and completely reoxydized to the trivalent state by due aeration or by agitation with oxygen. A test has revealed that in about 85% Ni, precipitated thereafter by the $CO_2$-saturation process, only 13% of the Co present in the liquor was co-precipitated. This outcome closely matches the results mentioned hereinbefore with reference to a synthetic liquor containing cobalt exclusively as red trivalent cobalt. Under such conditions a 15% co-precipitation of cobalt was found in 85% of the nickel precipitated from the liquor.

Both methods referred to are effective.

The following procedure will, for instance, give a readily marketable, highly pure nickel oxide product when treating a pregnant liquor containing in proportion 25% cobalt of (Ni+Co). Such liquors may be obtained, for instance, from reduced cobalt-earth. By applying an initial stepwise distillation of the liquor and isolating, after each step, the nickel precipitate formed, some 70% of the Co may be retained in the final filtrate. By redissolving the combined Ni-precipitates containing 30% of the cobalt values in ammonia liquor and converting all Co to the trivalent state by the methods outlined hereinbefore, a final nickel product will be obtained as a result of the combined refining treatments, said product containing less than 1% cobalt of (Ni+Co), and the product will be practically free from impurities.

Having now described the nature of pregnant ammonia-ammonium carbonate liquors containing Ni and Co, explained the impossibility of converting in such liquors, by straight aeration by or agitation with pure oxygen, the refractory Co-compounds to the trivalent state, and disclosed a method whereby this trouble can be overcome without the use of chemicals that are likely to contaminate the liquor etc., I claim:

1. A process of ensuring a high degree of oxydation of all complex cobalt ammonia compounds that may be present in nickel and cobalt containing ammonia-ammonium carbonate pregnant liquors to the trivalent or cobaltic state, said process consisting of two successive steps, to wit: (a) reducing substantially all cobalt present in the hot liquor to the bivalent state by means of finely divided nickel or sponge nickel in order to render refractory cobalt compounds amenable to oxydation with elemental oxygen to trivalent cobalt, and (b) reoxydizing with elemental oxygen substantially all bivalent cobalt in the liquor to the trivalent state.

2. In a process as claimed in claim 1, first precipitating the combined values of nickel and cobalt by distillation of the pregnant liquor in the presence of finely divided nickel or sponge nickel, thereafter redissolving the nickel precipitate containing bivalent cobalt in an ammonia-ammonium carbonate liquor, and thereupon subjecting this liquor to oxidation with elemental oxygen to convert substantially all cobalt in the liquor to the trivalent state.

References Cited in the file of this patent

UNITED STATES PATENTS

| | | |
|---|---|---|
| 2,290,313 | Caron | July 21, 1942 |
| 2,506,159 | Mantell | May 2, 1950 |
| 2,616,781 | Forward | Nov. 4, 1952 |
| 2,647,820 | Forward | Aug. 4, 1953 |

OTHER REFERENCES

"A Comprehensive Treatise on Inorganic and Theoretical Chemistry," by Mellor, vol. 14, pages 586 and 587, and vol. 15, page 161. Published by Longmans, Green and Co. (1936).

"The Oxidation States of the Elements and Their Potentials in Aqueous Solutions," by Latimer, W. M., published by Prentice-Hall, Inc. (1938), pages 3, 4, 300 and 301.